3,447,005
MOTOR CLUTCH BRAKE DEVICE
Masahiro Yokoyama, Nagoya, Japan, assignor to Mitsubishi Denki Kabushiki Kaisha, Tokyo, Japan
Filed July 14, 1966, Ser. No. 565,243
Claims priority, application Japan, July 30, 1965, 40/46,271
Int. Cl. H02k 7/10, 7/02, 7/112
U.S. Cl. 310—78                                     4 Claims

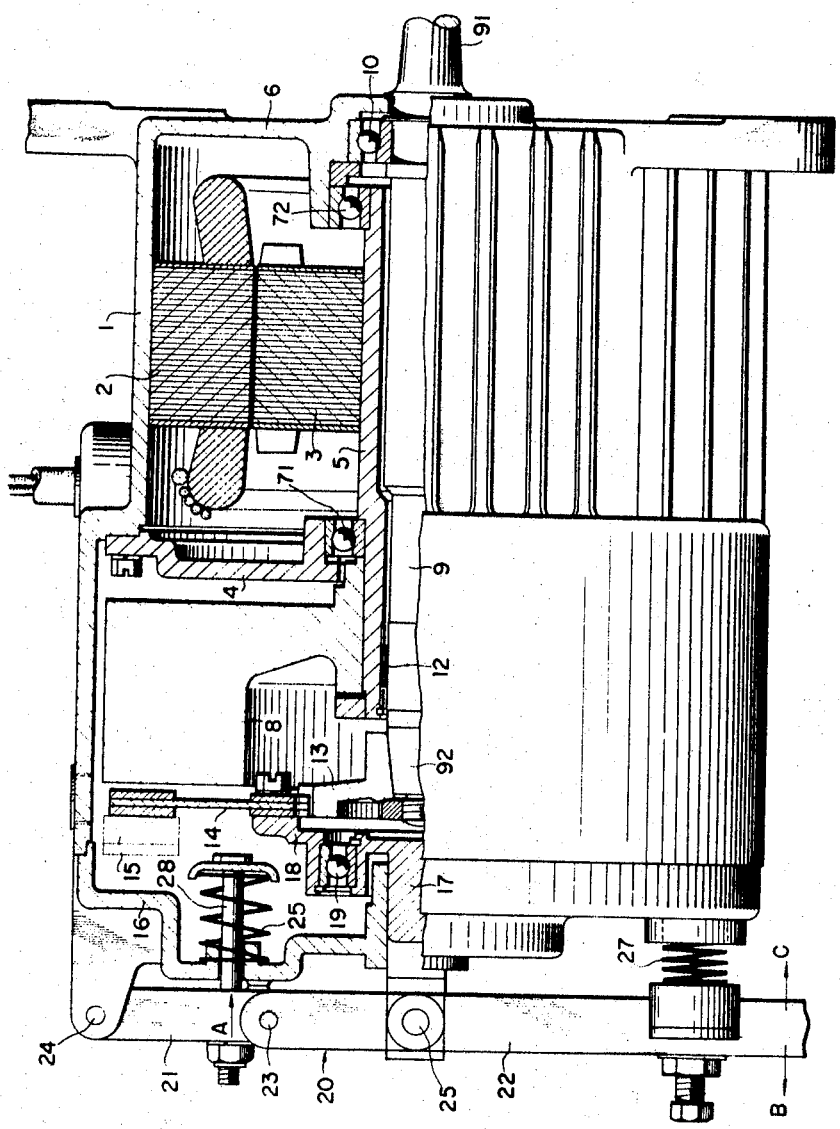

ABSTRACT OF THE DISCLOSURE

A motor clutch brake device having clutch means operated by an axially operated rod always applying a fixed control pressure kept at a fixed pressure value by operating levers connected in a toggle configuration.

---

This invention relates to an electric motor including a clutch and brake mechanism.

In general, electric motors including a clutch and a brake mechanism are used with machines such as weaving machines in which starting and stopping is very frequently effected. The conventional type of such motor is required to bear all the masses of rotation on its output shaft. Therefore, they are disadvantageous in that the overall length increases and the rigidity of the output shaft is very low while it is difficult to cause the output shaft to slide axially resulting in a slow clutching and declutching of the associated clutch.

Accordingly, it is an object of the invention to prevent the mass of rotation from being applied to an output shaft of a clutch motor to prevent a decrease in rigidity or inertia of the output shaft and also to operate the associated clutch without the output shaft being axially moved.

It is another object of the invention to provide a clutch motor including a new and improved construction preventing the mass of rotation from being applied to its output shaft.

It is still another object of the invention to provide a new and improved clutch motor including a clutch wheel movable without its output shaft being axially moved thereby ensuring the operation of the associated clutch.

It is another object of the invention to provide a new and improved clutch including means for imparting a predetermined fixed pressure to a clutch lever so as to always engage a clutch wheel with a fly wheel under a predetermined fixed pressure.

With the aforesaid objects in view, the invention resides in an electric clutch motor comprising a hollow rotor shaft including a rotor and a fly wheel rotatably carried by a bracket, and an output shaft rotatably extending through the hollow portion in the rotor shaft. The output shaft has one end capable of being coupled to a load. A clutch wheel is disposed on the output shaft at the other end for axial movement and engageable by the fly wheel; a pull rod is rotatably connected to the clutch wheel and operative to axially move the clutch wheel, and lever means pivotably mounted on the pull rod.

The invention will become more readily apparent from the following detailed description taken in conjunction with the accompanying drawing in which a single figure is a front view of one embodiment according to the invention with the upper portion illustrated in longitudinal section.

Referring now to the drawing, 1 designates a stator frame, 2 a magnetic stator core secured in a motor compartment formed within the stator frame 1, 3 a magnetic rotor core, and 4 designates an internal bracket disposed within the stator frame 1.

As shown in the drawing, a hollow rotor shaft 5 having fixed thereto the magnetic rotor core 3 is rotatably carried by the internal bracket 4 and another bracket 6 through ball bearings 71 and 72 respectively. The hollow rotor shaft 5 has a fly wheel 8 fixed on that end portion near to the internal bracket 4 and an output shaft 9 extending through the hollow portion therein. An end portion 91 of the output shaft 9, projecting beyond the stator frame 1, is adapted to have a load (not shown) coupled thereto. For convenience of description, the components or the sides thereof disposed near such a load may be called the front components or sides while the components or sides thereof remote from the load may be called the rear components or sides. For example, the bracket 6 is the front bracket and the ball bearing 71 is the rear ball bearing. The output shaft 9 is rotatably journaled on the front side by a ball bearing 10 secured to the front bracket 6 of the stator frame 1 and on the rear side by a needle bearing 12. The arrangement of the ball and needle bearings 10 and 12 respectively permits the output shaft 9 to be rotated independently of the rotor shaft 5.

A clutch wheel 14 is coupled on an inner or rear end portion 92 of the output shaft 9 by having a spline hub 13 fitted onto that end portion and axially movable to engage the fly wheel 8. A brake plate 15 is disposed opposite that side of the clutch wheel 14 remote from the fly wheel 8 and can be coupled to the clutch wheel 14.

As shown in the drawing, the stator frame 1 is provided on the rear side with a rear bracket 16 having a pull rod 17 disposed thereon substantially parallel to the output shaft 9 for axial movement. The pull rod 17 has a connector member 18 rotatably disposed through a ball bearing 19 on that end portion thereof facing the inner end portion 92 of the output shaft 9. The pull rod 17 is provided at the other end with a two part link or toggle-like unit 20 comprising a first and a second lever 21 and 22 extending substantially perpendicularly to the longitudinal axis of the rod. The first and second levers 21 and 22 are pivotably mounted together at one end by a pivot pin 23 with the first lever 21 pivotably mounted at the other end on the stator frame 1 by a pivot pin 24 while the second lever 22 pivotably mounted at an intermediate point to the other or rear end of the pull rod 17 by a pivot pin 26. A support bar 28 has one end secured to the first lever 21 and extends through the rear bracket 16. A compression spring 25 is disposed around the support bar 28 and between the inner side of the rear bracket and a nut on the other end portion of the bar 28. A compression spring 25 tends always to bias the first lever 21 in the direction of the arrow A while another compression spring 27 is disposed between the second lever 22 and the bracket 16 to tend always to bias the second lever in the direction of the arrow B.

The arrangement thus far described is operated as follows: It is now assumed that the lever unit 20 is its position illustrated in solid lines in which the clutch wheel 14 engages the brake plate 15 while the fly wheel 8 remains in a free state. Under these circumstances, energization of the magnetic stator core 2 causes the magnetic rotor core 3 and the fly wheel 8 to be rotated together with the rotor shaft 5 while the output shaft 9 remains staionary.

Then if the second lever 22 of the lever unit 20 is moved in the direction of the arrow C then this lever 22 is rotated in the direction of the arrow C about the axis of the pivot pin 23 to move the pull rod 17 in the direction of the arrow C. This permits the clutch wheel 14 coupled to the pull rod 17 to disengage from the brake plate 15 and to engage the fly wheel 8 with the result that the output shaft 9 is immediately driven to transmit power to a load (not shown). It is to be noted that at that time the connecting member 18 connected to the clutch wheel 14 is rotated along with the latter.

If it is assumed that the lever unit 20 has been moved in the direction of the arrow C by having an unnecessarily high force applied thereto then the second lever 22 will cause the first lever 21 to be rotated in the direction opposite to the direction of the arrow A about the connection 26 of the pull rod 17 and the second lever 22 and against the action of the compression spring 25 thereby to always apply a predetermined fixed pressure to the clutch wheel 14.

If it is required to stop the output shaft then the force tending to bias the second lever 22 in the direction of the arrow C can be removed. This causes the second lever 22 to move back in the direction of the arrow B by the action of the compression spring 27 whereupon the clutch wheel 14 disengages from the fly wheel 8 through the pull rod 17 while at the same time the clutch wheel 14 engages the brake wheel 15 to immediately stop the output shaft 9.

The invention has several advantages. For example, since the mass of rotation due to both the magnetic rotor core 3 and the fly wheel 8 is born upon the hollow rotor shaft 5 having a high rigidity, the output shaft 9 is not subject to that mass of rotation. This permits the output shaft 9 to be made relatively thin and hence the motor to be compact. Also directly journaling the rotor shaft 5 by the front and internal brackets 4 and 6 leads to a high degree of rotational accuracy. In addition coupling of the clutch wheel 14 to the output shaft 9 by splines eliminates the necessity of moving the output shaft which was previously required to be effected. Therefore, the present invention is particularly advantageously applicable to the case the output shaft is coupled to any load which is difficult to move the shaft.

While the invention has been shown and described in conjunction with a preferred embodiment thereof it is to be understood that the invention is not restricted to the arrangement shown and described and that various change in the details of construction and the arrangement and combination of parts may be restored to without departing from the spirit and scope of the invention.

What I claim is:

1. A motor clutch brake device comprising, an electric motor rotor, a rotatably mounted hollow shaft driven by said rotor, a flywheel connected to said hollow shaft, a rotatably mounted output shaft extending axially in said hollow shaft, clutch means to selectively couple the output shaft to said hollow shaft for driving the output shaft therefrom, means to operate the clutch comprising a rotatably mounted pull rod axially displaceable and operable axially for clutching and declutching said clutch means, means to accurately control the axial pressure necessary to operate the clutch means for clutching the clutch means comprising a first pivoted lever, means biasing said first lever in a direction for operating the pull rod in a first direction corresponding to a direction for clutching the clutch means, a second lever pivotally connected to the first lever and fulcrumed pivotally on said pull rod, means biasing the second lever remote from the fulcrum of said second lever and its connection to said first lever in a direction for operating the pull rod axially in a second direction opposite to said first direction and corresponding to a direction for declutching said clutch means, whereby when said second rod is operated in a direction corresponding to said first direction a selected pressure is always applied to said pull rod in clutching said clutch means.

2. A motor clutch brake device according to claim 1, in which said clutch means comprises a clutch wheel connected to said output shaft having splines, said flywheel having splines coaxial with said clutch wheel splines for coupling the clutch wheel and the flywheel in response to actuation of said second lever toward said first direction and uncoupling the clutch wheel and said flywheel in the absence of said actuation.

3. A motor brake device according to claim 2, including a brake for stopping said clutch wheel when said clutch means is reclutched thereby stopping said output shaft.

4. A motor clutch brake device according to claim 3, in which said brake means is disposed to be rendered effective by the means biasing said second lever toward said second direction.

References Cited

UNITED STATES PATENTS

| | | | |
|---|---|---|---|
| 1,663,607 | 3/1928 | Naul | 310—76 |
| 2,441,111 | 5/1948 | Delaplace | 310—83 |
| 2,809,308 | 10/1957 | Turner | 310—76 |
| 2,646,519 | 7/1953 | Kalikow | 310—76 |
| 2,646,520 | 7/1953 | Labastie | 310—76 |
| 2,650,995 | 9/1953 | Wendel | 310—76 |
| 2,809,308 | 10/1957 | Turner | 310—76 |
| 2,909,684 | 10/1959 | Peterson | 310—83 |

J D MILLER, *Primary Examiner.*

U.S. Cl. X.R.

310—74, 76, 77, 83, 98, 108